Oct. 7, 1969  R. S. PANCIOCCO  3,471,045
AUXILIARY EQUIPMENT FOR PICKUP TRUCKS

Filed Feb. 7, 1968  3 Sheets-Sheet 1

ROCCO S. PANCIOCCO
INVENTOR.

BY Ralph L. Cadwallader

ATTORNEY

Oct. 7, 1969 R. S. PANCIOCCO 3,471,045
AUXILIARY EQUIPMENT FOR PICKUP TRUCKS
Filed Feb. 7, 1968 3 Sheets-Sheet 2

ROCCO S. PANCIOCCO
INVENTOR

BY Ralph R. Cadwallader
ATTORNEY

Oct. 7, 1969  R. S. PANCIOCCO  3,471,045
AUXILIARY EQUIPMENT FOR PICKUP TRUCKS
Filed Feb. 7, 1968  3 Sheets-Sheet 3

ROCCO S. PANCIOCCO
INVENTOR.

BY Ralph L. Cadwallader

ATTORNEY

United States Patent Office 3,471,045
Patented Oct. 7, 1969

3,471,045
AUXILIARY EQUIPMENT FOR PICKUP TRUCKS
Rocco S. Panciocco, 94 York St.,
Stoughton, Mass. 02072
Filed Feb. 7, 1968, Ser. No. 703,713
Int. Cl. B60p *1/32;* B60r *5/04*
U.S. Cl. 214—83.24                                        5 Claims

ABSTRACT OF THE DISCLOSURE

Auxiliary equipment for pickup trucks for storing tools and materials and for dumping materials comprising channels secured to the inner side walls of the bed and disposed in slidable engagement with rollers located on a tool box and on a carriage hinged to a dump bed.

---

This invention relates generally to automotive vehicles and more particularly to auxiliary equipment of great utility to journeymen craftsmen such as carpenters, plumbers, electricians and the like.

While the invention has particular utility in connection with pickup trucks, and is shown and described in such connection, it is to be understood that its utility is not confined thereto.

A great number of journeymen craftsmen use pickup trucks or the like to transport tools, equipment and materials to the job site. A major problem confronting these craftsmen involves hauling the scrap, trash and debris they create way from the job site. Such material becomes mixed with their tools and equipment during transport and the task of removing it from the truck at the dump site is, more often than not, annoying and exasperating.

OBJECTS

It is, therefore, a principal object of the present invention to provide auxiliary equipment which can be readily installed on a conventional pickup truck or the like that will solve this problem.

Another object of the invention is to provide auxiliary equipment that will greatly increase the usefulness of pickup trucks.

A further object of the present invention is to provide auxiliary equipment having tool, equipment and materials storage functions.

Still another object of the invention is to provide auxiliary equipment also having a materials dumping function.

A further object of the invention is to provide auxiliary equipment of this character wherein installation thereof in pickup trucks now in use may be made with very slight or minor alterations in such pickup trucks.

Still a further object of the invention is the provision of such auxiliary equipment which is sturdy and durable in construction, reliable and efficient in operation, simple and inexpensive to manufacture and install and easy to operate.

The characteristics and advantages of the invention are further sufficiently referred to in connection with the following detailed description of the accompanying drawings, which illustrate a preferred embodiment of the inventive concept.

DESCRIPTION OF THE DRAWINGS

Referring to the drawings, which are for illustrative purposes only and in which like reference characters refer to the same parts throughout the several views.

DETAILED DESCRIPTION

Figure 2:
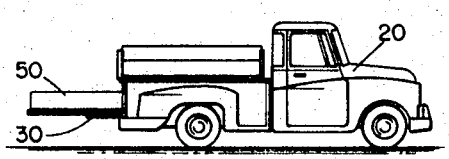
FIGURE 2 is a side view illustrating the pickup truck with the tool and equipment storage box drawn to the rear.

Having reference now to the drawings in detail, there is generally indicated at 20 the body of a conventional pickup truck or the like which is adapted to be mounted on a truck frame of conventional type, the latter not being shown. The body 20 comprises a floor 22 and side walls 24 and 24′. A front wall 26 is also provided adjacent the cab 28 of the pickup truck. The rear end of the pickup truck body is closed by a conventional tailgate 30, secured by a hinge 32 to floor 22.

Figure 1:
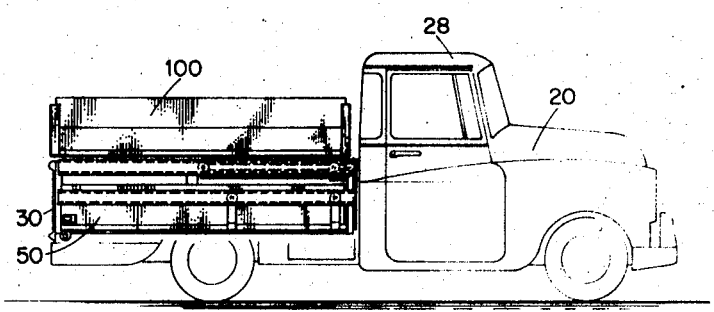
FIGURE 1 is a side view of a pickup truck with side wall partially removed to illustrate auxiliary equipment installed and disposed in travel position.

FIGURE 1 illustrates generally a pickup truck having side wall 24′ partially removed to show tool and equipment storage box 50, materials storage and dumping bed 100 and tailgate 30 secured in travel position.

Figure 3A:
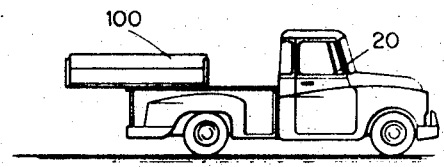
FIGURES 3A and 3B are side views of the pickup truck illustrating generally operation of materials storage and dumping functions.
Figure 3B:
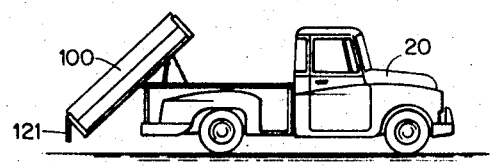

FIGURE 2 shows tool and equipment storage box 50 drawn to the rear. FIGURE 3A illustrates materials storage and dumping bed 100 as having rolled back to near its dumping position while FIGURE 3B illustrates it in its dumping position.

Figure 4:
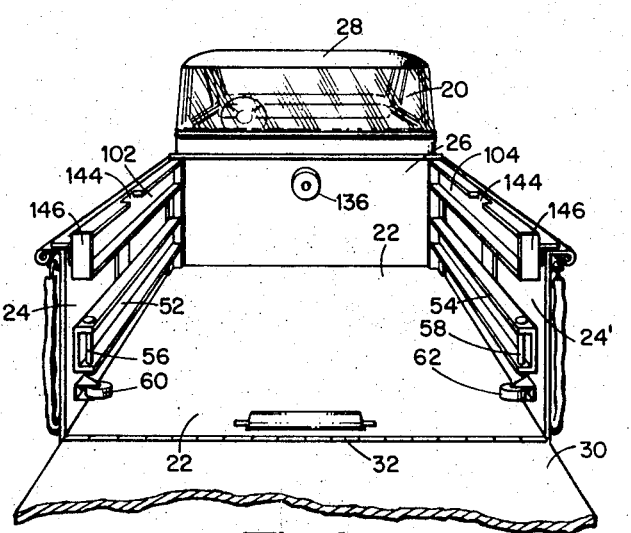
FIGURE 4 is a rear view of the body of a conventional pickup truck with tailgate down with U-shaped channels installed on the side walls.

FIGURE 4 illustrates body 20 as having U-shaped channels 52 and 102 secured, as by welding or by suitable bolts, to wall 24 and U-shaped channels 54 and 104 likewise secured to wall 24′. U-shaped channels 52, 54, 102 and 104 extend the full length of side walls 24 and 24′. Channels 52 and 54 serve to support and guide tool and equipment storage box 50 while channels 102 and 104 support and guide materials storage and dumping bed 100 and its associated carriage 106. Bolts 56 and 58 near the rear end of channels 52 and 54 serve to limit the rearward movement of tool and equipment storage box 50 as will become more apparent hereinafter. Rollers 60 and 62 serve to guide tool and equipment storage box 50.

Figure 5:
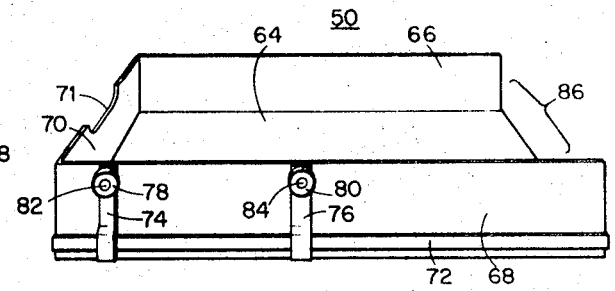
FIGURE 5 is a perspective view illustrating the tool and equipment box.
Figure 8:
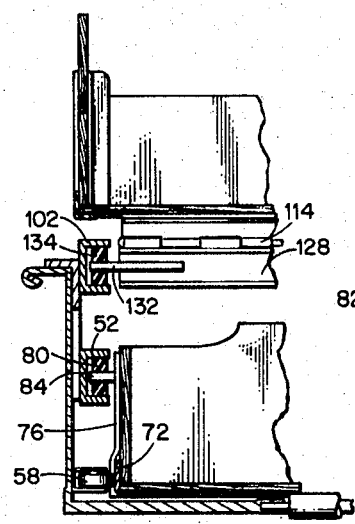
FIGURE 8 is a partial view taken from the rear showing the auxiliary equipment installed with a portion of the pickup truck body in section.

FIGURE 5 illustrates tool and equipment storage box 50 as comprising floor 64, side walls 66 and 68 and front wall 70, all of which may be made of plywood, planking, or sheet metal. Note cut-out 71 in front wall 70; its function will be explained hereinafter. FIGURE 5 illustrates them as being made of plywood with longitudinal members 72 (on each side, with only one side being shown) secured along the bottom edges to provide strength and to function as tracks for guide rollers 60 and 62. Vertical metal members 74 and 76, one of each on each side and secured to side walls 66 and 68 by conventional means, provide support and means for mounting rollers 78 and 80 by means of axles 82 and 84 to each side wall. Support 76, a roller 80, an axle 84 and channel 52 are shown in more detail in FIGURE 8.

Referring now to FIGURES 4 and 5, rollers 78 and 80 on each side fit in channels 52 and 54 with front wall 70 disposed adjacent cab 28 of body 20. Note that cut-out 71 will clear winch motor 136. Floor 64 and side walls 66 and 68 are just long enough for the open end 86 of tool and equipment storage box 50 to be closed by tailgate 30 when tailgate 30 is latched closed in the travel position. To remove equipment, tailgate 30 is unlatched and dropped; tool and equipment storage box 50 is pulled to the rear, its rearward movement being limited by the action of rollers 80 contacting bolts 56 and 58. The equipment may then be removed.

Figure 7:
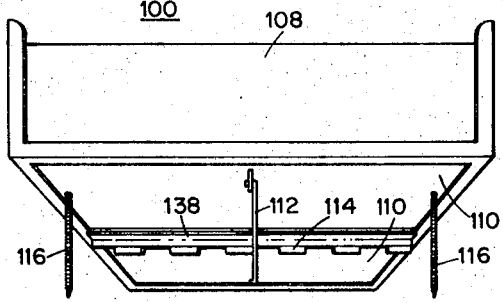
FIGURE 7 is a perspective view looking underneath the materials storage and dumping box toward its rear.
Figure 9:
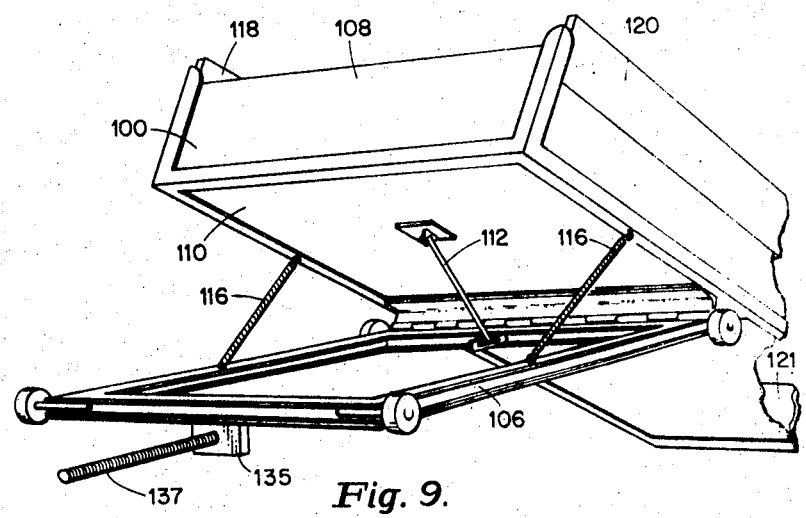
FIGURE 9 is a perspective view illustrating the dumping function of the components of FIGURES 6 and 7.

FIGURE 7 illustrates front wall 108, floor 110, latch 112, half of hinge 114 and springs 116 of materials storage and dumping bed 100. FIGURE 9 also shows its side walls 118 and 120 and tailgate 121. The half of hinge 114 is located at, or slightly to the rear of, the center of gravity of materials storage and dumping bed 100. This insures that bed 100 will rotate back to the horizontal after the load is dumped. Springs 116 further insure that this action occurs. It will be obvious that the load may be concentrated to the rear of hinge 114 to facilitate dumping. In such event, the resultant center of gravity of the combination of the load and of storage and dumping bed 100 will be to the rear of hinge 114 so that gravity, rather than a complex mechanism, may be utilized to dump the load.

Figure 6:
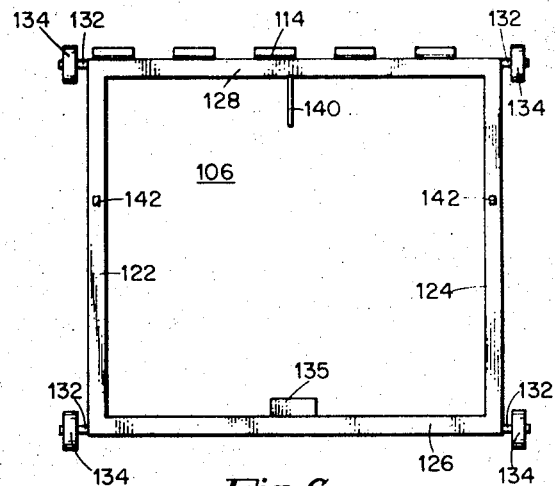
FIGURE 6 is a top view illustrating the carriage to which the materials storage and dumping box is affixed.

FIGURE 6 illustrates details of carriage 106 which comprises side beams 122 and 124, front beam 126 and rear beam 128. These beams may be made of structural steel or aluminum such as channels and are conveniently welded together at the corners. Similarly axles 132, located at the corners as shown, are conventionally welded to beams 126 and 128. Rollers 134 are mounted on axles 132 as shown. The other half of hinge 114 is welded to the rear edge of beam 128 as illustrated. Welded to the one edge of and extending below beam 126 at its center is threaded member 135 which cooperates with drive rod 137 (see FIGS. 9 and 10) to control the movement of carriage 106 and thus materials storage and dumping bed 100.

Hinge 114 is illustrated as comprising a plurality of steel pipes. Each may be, for example, 1½ inches OD and 6 inches in length. They are welded in alternating relationship to steel strap 138, affixed by conventional means to the bottom of bed 100, and to the rear edge of beam 128. When meshed together a steel rod may be passed therethrough and secured at the ends to form a butt hinge. Obviously other hinges may be utilized.

Latch plate 140 is welded at the center of the front edge of beam 128. Latch plate 140 cooperates with latch 112 to limit the downward rotation of bed 100 when the load therein is being dumped. Tailgate 121 may be affixed by conventional means and arranged to hang free when unlatched as illustrated in FIGURE 3B.

Springs 116 are secured to the bottom of bed 100 by conventional means and to carriage 106 by conventional means such as eyes 142.

Referring back to FIGURE 4 note slots 144 in channels 102 and 104. Slots 144 are so located that rollers 134 of carriage 106 may be inserted into channels 102 and 104. End stops 146 are welded to the rear ends of channels 102 and 104 and function to limit the rearward movement of carriage 106.

Figure 10:
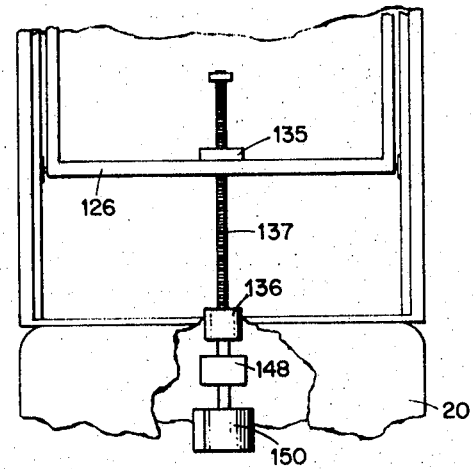
FIGURE 10 illustrates schematically in plan view the mechanism for controlling the rearward movement of the carriage of FIGURE 6.

As illustrated in FIGURE 10 electric winch motor 136 is powered by the truck electric power system 150 through reversing switch 148. Motor 136 rotates drive rod 137 through member 135 to move carriage 106 to the rear and back to the travel position. Drive rod 137 may be threaded for substantially its entire length with, for exemple, an Aetna thread. Obviously other means such as chain drives may be utilized to move carriage 106 to the rear and back to the travel position.

To perform the dumping function the pickup truck is stopped and motor 136 operated to move carriage 106 to the rear until rollers 134 contact end stops 146. During this movement of carriage 106, dump bed 100 by virtue of its weight and the weight of the load must remain substantially horizontal with, in some instances, its rear corners in contact with the top surfaces of channels 102 and 104. At this point, with the load so distributed that the resultant center of gravity of the load and dump bed 100 is to the rear of hinge 114, dump bed 100 rotates downward about hinge 114 and the load is dumped. With the load removed, the center of gravity of dump bed 100 is forward of hinge 114. This together with the action of springs 116 cause dump bed 100 to rotate back to the horizontal. Motor 136 is reversed, causing carriage 106 to move forward until front wall 108 is stopped by the rear wall of cab 28. Motor 136 may, of course, be equipped with limit switches to stop its operation when either of both limits is reached.

SUMMARY

From the foregoing it will now be seen that there is herein provided improved auxiliary equipment for pickup trucks or the like which accomplishes all the objects of this invention, and others, including many advantages of great practical utility and commercial importance.

As many embodiments may be made of this inventive concept and as many modifications may be made in the embodient hereinbefore shown and described, it is to be understood that all matter herein is to be interpreted merely as illustrative, and not in a limiting sense.

I claim:
1. The combination comprising:
   a pickup truck having a cab and an open bed equipped with a floor, a front wall, longitudinally extending parallel side walls with inner surfaces and a tailgate;
   a first U-shaped channel secured to the inner surface of each side wall, parallel to and at a first predetermined height above the floor, with the opening of the channel facing inwardly;
   a first auxiliary box including a floor, a front wall and parallel side walls having rollers secured to the exterior surfaces thereof disposed for rolling relationship with said channels;
   a second U-shaped channel secured to the inner surface of each side wall, parallel to and at a second predetermined height above the floor with the opening of said second channel facing inwardly;
   a carriage comprising:
      side beams, front and rear beams, said beams being secured at the corners to form a rectangular, unitary structure,
      a first hinge section welded to said rear beam,
      a threaded member secured at the center of and extending below said front beam,
      roller axles secured to said front and rear beams and extending perpendicularly beyond said side beams at each corner, and
      additional rollers affixed to said roller axles, said carriage being arranged for rolling relationship between said additional rollers and said second channels, said second predetermined distance being greater than said first predetermined distance by an amount sufficient to permit said carriage to clear said first auxiliary box;
   a second auxiliary box including a floor, a front wall, parallel side walls and a tailgate with a second hinge section secured to the floor thereof adapted to form a butt hinge with said first hinge section to permit rotation of said second auxiliary box with respect to said carriage;
   an electric winch motor mounted on the front wall of said open bed connected through a reversing switch to the truck's electric power system; and
   a threaded drive rod secured to the winch motor drive shaft and threadably engaged with said threaded member, said drive rod being of such length that when driven by said winch motor said carriage may be moved to the rear of said truck.

2. Auxiliary equipment for a pickup truck, having a cab and an open bed equipped with a floor, a front wall, longitudinally extending parallel side walls with inner surfaces and a tailgate, for providing storage thereon for tools and materials and a dumping capability for said materials, said auxiliary equipment comprising:

a first pair of U-shaped channels secured to the inner surfaces of said side walls, parallel to and at a first predetermined height above the floor, with the openings of said channels facing each other;

a second pair of U-shaped channels secured to the inner surfaces of said side walls, parallel to and at a second predetermined height above said first pair of U-shaped channels, with the openings of said second pair of channels facing each other;

a first auxiliary box having rollers secured to the exterior surfaces thereof disposed for rolling relationship with said first pair of U-shaped channels;

a carriage having rollers secured to the sides thereof adapted for rolling relationship with said second pair of U-shaped channels, said second predetermined height being sufficient to provide clearance between said carriage and said first auxiliary box; and a second auxiliary box hinged to the rear edge of said carriage.

3. Auxiliary equipment as in claim 2 in which said second auxiliary box is hinged just to the rear of its center of gravity to the rear edge of said carriage.

4. Auxiliary equipment as in claim 2 in which said second auxiliary box is hinged just to the rear of its center of gravity to the rear edge of said carriage.

5. Auxiliary equipment as in claim 2 further comprising:

an electric winch motor mounted on the front wall of said open bed and reversably controlled from within said cab; and a drive shaft secured to the winch motor and threadably engaged to move said carriage.

References Cited

UNITED STATES PATENTS

| | | | |
|---|---|---|---|
| 2,091,071 | 8/1937 | Girl | 214—83.24 X |
| 2,094,401 | 9/1937 | Girl | 296—37 X |
| 2,530,578 | 11/1950 | Hotop | 296—24 |
| 2,784,027 | 3/1957 | Temp. | |
| 2,852,303 | 9/1958 | Hopson | 296—26 |
| 2,970,004 | 1/1961 | Ratner | 296—28 |
| 3,055,709 | 9/1962 | Kirkwood | 298—1 |

FOREIGN PATENTS

| | | |
|---|---|---|
| 635,187 | 4/1950 | Great Britain. |
| 1,278,035 | 10/1961 | France. |

RICHARD J. JOHNSON, Primary Examiner

U.S. Cl. X.R.

296—37; 298—14

PO-1050
(5/69)

UNITED STATES PATENT OFFICE
CERTIFICATE OF CORRECTION

Patent No. 3,471,045          Dated  October 7, 1969

Inventor(s) Rocco S. Panciocco

It is certified that error appears in the above-identified patent and that said Letters Patent are hereby corrected as shown below:

Column 2, line 5, after "down" insert --and--.

Column 5, line 27, delete "just to the rear of" and insert --at--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents